United States Patent

Renard et al.

[11] Patent Number: 5,747,569
[45] Date of Patent: May 5, 1998

[54] COMPOSITION FOR FLAME-RETARDANT CAST PANELS MADE OF (METH)ACRYLIC POLYMERS AND PANELS OBTAINED FROM THIS COMPOSITION

[75] Inventors: Lucien Renard; Patrick Delprat; Philippe Heim, all of Pau, France

[73] Assignee: Atohaas Holding C.V., Haarlem, Netherlands

[21] Appl. No.: 743,790

[22] Filed: Nov. 5, 1996

[30] Foreign Application Priority Data

Nov. 6, 1995 [FR] France ................ 95 13073

[51] Int. Cl.$^6$ .................... C08K 5/52; C08K 5/49
[52] U.S. Cl. ............ 524/140; 524/706; 524/710; 524/712; 526/193; 526/233
[58] Field of Search .................... 524/140, 706, 524/710, 712; 526/193, 233

[56] References Cited

U.S. PATENT DOCUMENTS 3,030,327  4/1962  Hosch et al. .................... 524/706

FOREIGN PATENT DOCUMENTS 1 443 982  7/1976  United Kingdom .

*Primary Examiner*—Kriellion S. Morgan
*Attorney, Agent, or Firm*—Millen, White, Zelano, & Branigan, P.C.

[57] ABSTRACT

The invention relates to compositions for flame-retardant cast panels made of (meth)acrylic polymers.

The composition comprises at least one (meth)acrylic ester monomer, (meth)acrylic acid and at least one phosphorus compound which is anhydrous and is chosen from phosphoric acids, phosphoric acid esters or their mixtures, optionally in combination with an optionally halogenated neutral phosphoric ester. The amount of (meth)acrylic acid and of phosphorus compound, by weight with respect to the total mixture constituting the composition, is such that the flame-retardancy coefficient FRC:

$$(\% \text{ phosphoric acid}) \times 0.13 + (\% \text{ P-ester}) \times 0.20 + (\% \text{ OH-ester}) \times 0.14 + (\% \text{ (meth)acrylic acid}) \times 0.025 + 1.17 \times$$

$$(\% \text{ halogenated P-esters}) \times \frac{\text{Halogen atom no.}}{M \text{ (halogenated P-esters)}},$$

is greater than 0.95.

23 Claims, No Drawings

COMPOSITION FOR FLAME-RETARDANT CAST PANELS MADE OF (METH)ACRYLIC POLYMERS AND PANELS OBTAINED FROM THIS COMPOSITION

BACKGROUND OF THE INVENTION

The present invention relates to the manufacture of flame-retardant cast panels made of (meth)acrylic polymers.

Poly(methyl methacrylate) (PMMA) is a substance which is known for its particularly advantageous properties, in particular transparency and resistance to solvents and to U.V radiation. Cast PMMA panels are not, however, sufficiently flame-retarded to be used in certain fields, such as construction, which requires materials which are VO in the UL 94 vertical test (defined subsequently).

The flame-retardancy of cast panels made of (meth) acrylic polymers by phosphoric acid has been known for a long time and has been described in particular in U.S. Pat. No. 3,030,327. In this patent, it is envisaged, inter alia, to add approximately 0.5 to 20% by weight of phosphoric acid, on the basis of the weight of the mixture, to (meth)acrylate monomers, such as methyl methacrylate, optionally in combination with olefinic monomers which are copolymerizable with these (meth)acrylate monomers, for example styrene, acrylonitrile, vinyl acetate, vinyl chloride, (meth)acrylic acid or their esters, and the like. The hydrophilic properties of this composition can be decreased by the addition of a hydrophobic agent, such as a silicone oil, or an agent which is less hydrophilic than phosphoric acid, such as a neutral ester of phosphoric acid, such as tris(chloroethyl) phosphate. Some compositions given as examples comprise methyl methacrylate, methacrylic acid as comonomer, orthophosphoric acid as an 89% aqueous solution and, optionally, tris(chloroethyl) phosphate. In some examples, methacrylic acid is replaced by an alkyl methacrylate or an alkyl acrylate, acrylonitrile or styrene. In the compositions of the examples, the comonomers represent 5 or 10% by weight of the total composition.

However, despite the simplicity of the formulations, the panels obtained from these compositions have a disadvantage in that a phenomenon of migration of phosphoric acid towards the surface was observed, a phenomenon which is detectable from manufacture by a "greasy feel" (very noticeable production of an impression) and then, with time, by the appearance of a light covering or of off-white stains which have a tendency to spread and which develop, in certain cases, towards complete opacification.

It is certainly entirely possible to incorporate 1% by weight of phosphoric acid in a panel made of (meth)acrylic polymers without observing migration but, in this case, the panel is not flame-retardant. To obtain a suitably flame-retarded panel, that is to say one which is classified as VO in the UL 94 vertical test, it is necessary to incorporate a minimum of 7% by weight of phosphoric acid and, in this case, stains appear after approximately two weeks.

Atohaas Holding CV has therefore sought to find compositions based on (meth)acrylic monomers and on phosphorus compound which make it possible to prepare flame-retardant panels which are classified as VO in the UL 94 vertical test and which, moreover, no longer exhibit this problem of migration of phosphoric acid.

SUMMARY OF THE INVENTION

It has been discovered that some panels, with a very specific composition, exhibit no visual detrimental change after ageing for several months. The results of an in-depth study of this phenomenon reveal a specific area in which the formulations result in cast panels made of (meth)acrylic polymers which are entirely stable in a moist atmosphere at ambient temperature.

The subject of-the present invention is therefore a composition for flame-retardant cast panels of (meth)acrylic copolymers, the said composition containing (a) at least one (meth)acrylic ester monomer and, optionally, an ethylenically unsaturated monomer copolymerizable with the (meth) acrylic ester monomer, (b) (meth)acrylic acid and (c) at least one phosphorus compound. This composition is characterized in that the phosphorus compound is in the anhydrous state and is chosen from phosphoric acids and phosphoric acid esters or their mixtures, optionally in combination with at least one optionally halogenated neutral phosphoric ester, and in that it comprises by reference to the total weight of the components (a), (b) and (c), from 65 to 85% by weight of compound (a) and the proportions of compounds (b) and (c) such that their ratio (b)/(c) is greater than 0.9 and in that the flame-retardancy coefficient FRC, which is equal to:

$$0.025 \times \% \text{ (meth)acrylic acid} + 0.13 \times \% \text{ phosphoric acid} + 0.14 \times \% \text{ OH-ester} + 0.20 \times \% \text{ P-ester} + 1.17 \times$$
$$\% \text{ halogenated P-ester} \times \frac{\text{Halogen atom no.}}{\text{M (halogenated P-ester)}}$$

is greater than 0.95.

"% phosphoric acid" is understood to mean the percentage, by weight, of phosphoric acid or of polyphosphoric acid in the composition (a)+(b)+(c).

"% P-ester" is understood to mean the percentage, by weight, of phosphorus originating from esters of phosphoric or polyphosphoric acids in the composition (a)+(b)+(c).

"% OH-ester" is understood to mean the percentage, by weight, of hydroxyl group bonded to the phosphorus originating from phosphoric or polyphosphoric acids or from hydrogen phosphates in the composition (a)+(b)+(c).

"% (meth)acrylic acid" is understood to mean the percentage, by weight, of acrylic or methacrylic acid in the composition (a)+(b)+(c).

"% halogenated P-ester" is understood to mean the percentage, by weight, of halogenated neutral phosphoric ester. The expression "M (halogenated P-ester)" is used for the molecular mass of this ester.

It is important that the phosphorus compound should be anhydrous, in order to avoid the incorporation of water molecules at the heart of the polymer which create an unfavorable initial state and increase the rate of appearance of defects.

The compound (b) can be methacrylic acid and/or acrylic acid.

Use may be made, as phosphorus compound (c), of orthophosphoric, pyrophosphoric, metaphosphoric or polyphosphoric (tripolyphosphoric or tetrapolyphosphoric) acids or their mixtures, alkyl hydrogen phosphates, optionally associated with phosphoric triesters, which may or may not be halogenated.

Use may be made, in the invention, as alkyl hydrogen phosphates, of alkyl mono- or dihydrogen phosphates, in which the alkyl contains 1 to 4 carbon atoms, or their mixtures.

A mixture of phosphoric acids which is useful in the invention comprises, for example, 49–56% of orthophosphoric acid ($H_3PO_4$), 39–42% of pyrophosphoric acid ($H_4P_2O_7$) 5–8% of triphosphoric acid ($H_5P_3O_{10}$) and less than 1% of tetraphosphoric acid ($H_6P_4O_{13}$). This mixture is sold under the trade name Acide 104 by Elf Atochem S. A.

Mention may be made, as halogenated neutral ester of phosphoric acid, of tris(haloalkyl) phosphates in which the halogen is chlorine or bromine and the alkyl group has from 1 to 4 carbon atoms, such as tris(chloromethyl) phosphate, tris(chloroethyl) phosphate, tris(bromomethyl) phosphate, tris(bromoethyl) phosphate, tris(chloropropyl) phosphate and tris(bromopropyl) phosphate; mention is made in particular of tris(chloroethyl) phosphate.

Mention may be made, as neutral ester of phosphoric acid, of alkyl phosphates in which the alkyl group has from 1 to 4 carbon atoms, such as methyl phosphate and ethyl phosphate.

The compound (a) can comprise 100 to 80% by weight of a (meth)acrylic ester monomer, particularly methyl methacrylate, and from 0 to 20% by weight of a monomer having at least one ethylenic unsaturation which is copolymerizable with the (meth)acrylic ester monomer and (meth) acrylic acid. Mention may be made, for example, of alkyl (meth)acrylates or of halogenated alkyl (meth)acrylates in which the alkyl group has from 2 to 12 carbon atoms, for example ethyl, butyl or 2-ethylhexyl methacrylate, methyl, ethyl or butyl acrylate, 2-hydroxyethyl methacrylate or acrylate, cyclohexyl methacrylate or acrylate, benzyl methacrylate or acrylate, 2-chloroethyl methacrylate, 2,3-dibromopropyl methacrylate, chloromethyl methacrylate, styrene, styrene substituted by an alkyl group, such as a-methylstyrene, and styrene substituted by a halogen, such as monochlorostyrene, methacrylonitrile, acrylonitrile, acrylamide, diacetone acrylamide, methacrylamide, N-hydroxymethylmethacrylamide, N-(methoxymethyl) methacrylamide, N-hydroxymethylacrylamide, N-alkylmaleimide, maleic acid and itaconic acid.

The flame-retardancy coefficient FRC, as defined above, must be at least equal to 0.95. If it is less than 0.95, the composition cannot be classified as VO in the UL 94 vertical test. The various coefficients 0.025, 0.13, 0.14, 0.20 and 1.17 account for the contribution to the flame-retardancy of the associated component.

The ratio of the percentage, by weight, of the compound (b) to that of the compound (c) is advantageously between 0.9 and 3 and more particularly between 1 and 1.7.

(Meth)acrylic acid (b) is useful for compensating for the deterioration in the optical properties due to the main flame-retardant additive and, in particular, is also used to reinforce the flame-retardant properties of the polymer.

The phosphoric acid and phosphoric acid triester components additionally facilitate release of the panels from the mold, by reducing the adhesion of the methyl methacrylate-methacrylic acid copolymer to the glass plates. Breakage during release from the mold is thus avoided.

Mention may be made, as examples of compositions according to the invention, of the following (% by weight):

75% of methyl methacrylate, 15% of methacrylic acid, 5% of anhydrous orthophosphoric acid and 5% of tris(chloroethyl) phosphate; and 70% of methyl methacrylate, 15% of methacrylic acid and 15% of ethyl hydrogen phosphate in the form of a 50:50 by mole mixture of monoester and of diester;

75% of methyl methacrylate, 15% of methacrylic acid, 5% of a mixture comprising 49 to 56% of orthophosphoric acid, 39 to 42% of pyrophosphoric acid, 5 to 8% of tripolyphosphoric acid and less than 1% of tetrapolyphosphoric acid (mixture sold under the trade name Acide 104 by Elf Atochem S. A. ) and 5% of tris (chloroethyl) phosphate.

The composition according to the invention can also furthermore contain, with respect to the sum of the components (a) to (c):

up to 2% by weight of at least one crosslinking agent, the introduction of which makes it possible not to obtain, with fire, a dripping nature on the sample;

up to 1% by weight of at least one radical polymerization initiator, in particular of the azo or peroxide type, such as azobis(isobutyronitrile), azobis(cyclohexane-1-carbonitrile) or azobis(dimethylvaleronitrile) or dicumyl peroxide, tert-butyl cumyl peroxide or tert-butyl peroxide;

up to 1% by weight of at least one ultraviolet-radiation absorber, such as the products Tinuvin 770, Tinuvin P or Tinuvin 372 marketed by Ciba-Geigy;

up to 1% by weight of at least one chain-limiting agent which can, in particular, be chosen from diunsaturated monocyclic terpenes or monounsaturated bicyclic terpenes.

Use may be made, as crosslinking agent, of, for example:

1. compounds having at least two polymerizable double bonds and,
2. compounds having at least one polymerizable double bond and at least one functional group which reacts with the (meth)acrylic monomer and, if appropriate, its comonomer.

Mention may be made, as examples of the above crosslinking compounds having at least two polymerizable double bonds, of:

a) di- or polyvinyl compounds, such as, in particular, divinylbenzene, divinyltoluene, divinylxylene, divinyl ether, divinyl ketone and trivinylbenzene, b) di- or polyesters of unsaturated mono- or polycarboxylic acids with polyols, such as di- or triesters of (meth)acrylic acids with polyols (such as ethylene glycol, trimethylolpropane, glycerol, polyoxyethylene glycols, polyoxypropylene glycols, and the like), unsaturated polyesters (which may be obtained by reaction of any one of the abovementioned polyols with an unsaturated acid, such as maleic acid), and the like, c) bis(meth)acrylamides, such as N,N-methylenebisacrylamide, d) carbamyl esters, which may be obtained by reacting polyisocyanates (such as toluene diisocyanate, hexamethylene diisocyanate, diphenylmethane 4,4-diisocyanate, and the like) and prepolymers containing an NCO group obtained by reacting such a diisocyanate with compounds containing active hydrogen atoms with monomers containing hydroxyl groups. Such esters are in particular the diesters of (meth)acrylic acids which may be obtained by reacting the abovementioned diisocyanates with hydroxymethyl (meth) acrylate, e) di- or poly(meth)allyl ethers of polyols, such as alkylene glycols, glycerol, polyalkylene glycols, polyoxyalkylene polyols, carbohydrates, and the like, such as the diallyl ether of polyethylene glycol, allylated starch and allylated cellulose, f) di- or polyallyl esters of polycarboxylic acids, such as diallyl phthalate, diallyl adipate, and the like, and g) esters of unsaturated mono- or polycarboxylic acids with mono(meth)allyl ethers of polyols, such as the ester of (meth)acrylic acid with the monoallyl ether of polyethylene glycol.

The formulation may, in addition, contain:

one or a number of agent(s) facilitating release from the mold, such as fatty acids, fatty acid salts or esters, or ethoxylated esters of (poly)phosphoric acids, one or a number of pigment(s) making it possible to obtain colored panels;

various fillers which make it possible to render the panels opaque or opalescent.

The present invention also applies to the cast panels obtained from the composition as defined above.

The preparation of the cast panels is carried out in two or three stages depending on whether or not a prepolymerization is carried out.

Prepolymerization

All the starting materials necessary to form the cast panel may be mixed from this first stage. However, the phosphorus compounds may be introduced subsequently, at the polymerization stage.

For this prepolymerization, the mixture is brought to a temperature in a range from 30° C. to 140° C., at atmospheric pressure to 100° C. (preferably 80° C. to 95° C.) or under autogenous pressure above 100° C., so as to reach a viscosity of between 30 and 1000 mpa·s (preferably between 200 and 400 mPa·s). The mixture is then cooled between 20° and 40° C.

Polymerization

The phosphorus compounds, if the latter have not been introduced in the prepolymerization stage, are introduced into the reactor, along with the polymerization and postpolymerization initiators. The mixture thus formed is deaerated for 1 to 4 hours under reduced pressure between 0.1 and 0.5 bar absolute and then introduced between two glass plates. The assembly is brought to a temperature in a range from 30° C. to 100° C., preferably 55° C. to 70° C., for 2 to 20 hours.

Postpolymerization

The panel thus formed is brought to a high temperature, between 90° C. and 140° C., preferably between 115° C. and 130° C., for 1 to 4 hours.

The process according to the present invention makes it possible to manufacture cast panels having a thickness of between 1.5 and 25 mm. However, the range of manufacture of the flame-retarded panels is preferably restricted to thicknesses ranging from 3 to 10 mm.

The following examples illustrate the present invention without, however, limiting the scope thereof. In the examples, the parts are by weight, except where otherwise indicated.

Examples 1 to 10

Examples 1 to 5 are examples according to the invention. Examples 6 to 10 are control examples.
General procedure for the manufacture of panels made of (meth)acrylic polymers.

The (meth)acrylic monomer, for example methyl methacrylate, then the various components shown in Table 1, in the proportions by weight shown in this table, for a total of 200 g, as well as 0.4 g of ethylene glycol dimethacrylate, 400 ppm of azobisisobutyronitrile, 450 ppm of 1,1'-azobis (2,4-dimethylvaleronitrile), marketed by the company Wako under the name "V40", and 350 ppm of the UV-radiation absorber marketed by the company Ciba-Geigy under the name "Tinuvin P", are introduced successively into a vacuum flask with a capacity of 1 litre.

The mixture is stirred at ambient temperature for 15 minutes and is degassed for 30 minutes under a progressive vacuum from $1.01 \times 10^5$ Pa to $2.66 \times 10^3$ Pa (760 to 20 torrs).

At the same time, a mold is prepared consisting of two glass plates held parallel, separated by a distance of 4 mm, by a PVC (poly(vinyl chloride)) retaining ring and clip system. The two ends of the retaining ring are kept apart in order to enable the reaction mixture to be introduced.

The mixture is poured into the mould using a funnel. The two ends of the retaining ring are then brought into contact, compressed against one another and held fast by positioning the last clips.

The mold and its contents are then introduced into a water bath thermostatically controlled at 60° C. After a period of time, of approximately 12 hours, which is sufficient for the polymerization to have come to completion, that is to say for approximately 85% of conversion to have been achieved, the panels are removed from the bath and are placed in an air oven at 110° C. for approximately 1 h 30 min in order for them to undergo postpolymerization therein.

At the end of the cycle, the panels are taken out of the oven and are left to cool in the open air. When they are cold, the clips are removed and the panels are released from their molds.

The polymer panels obtained are characterized by their property towards fire from the UL 94 vertical test and their optical properties from the value of the haze after ageing. The protocols for these various characterization methods are stated below:

UL 94 vertical test

Polymer test specimens, cut out from the panels obtained, in the form of small bars with a width of 12.7 mm and a length of 100 mm placed in the vertical position, are subjected, in a closed environment, to the action of the flame of a gas burner, with two applications of 10 seconds, in order to decide, after each of these applications, whether or not the material continues to burn. The second application only takes place when the fire stops with the first.

The burner, fed by natural gas with a low flow rate, is adjusted so as to obtain a heating and non-illuminating flame with a height of 20 mm.

The test specimen is classified as negative if, after two applications of 10 seconds, the material burns for more than 30 seconds.

The test specimen is classified as VO if, after two applications of 10 seconds, the material becomes extinguished before 30 seconds.

Haze according to ASTM Standard 1000-361, EN 2155 Part 9 (1989)

Haze after ageing

1) Polymer test specimens, cut out from the panels obtained, in the form of small 7 cm long×7 cm wide bars are suspended using a clip in an oven at 40° C. and 57.5% relative humidity.

After a period of time of 170 hours, the value of the haze is measured as indicated above.

2) Polymer test specimens, cut out from the panels obtained, in the form of small 7 cm long×7 cm wide bars are suspended using a clip in an oven at 21° C. and 55% relative humidity. After 2100 hours, the value of the haze is measured as indicated above.

The samples are considered as good up to 4% of haze (test for 2100 hours).

The amounts of the components and the results obtained are given in Table 1. The panels obtained in Examples 2 to 4 are very easily released from the mold. The panels obtained in the control examples either do not meet the UL 94 vertical test, which determines the properties towards fire, or exhibit an unacceptable haze.

The entire disclosures of all applications, patents and publications, cited above, and of corresponding application (s) French No. 95,13073, filed Nov. 6, 1995, are hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

of phosphoric acids comprising, by weight, 49–56% of orthophosphoric acid, 39–42% of pyrophosphoric acid, 5–8% of triphosphoric acid and less than 1% of tetraphosphoric acid.

5. A composition according to claim 2, wherein the phosphoric triester is an alkyl phosphate or a tris(haloalkyl)

TABLE 1

| Compositions | Examples | | | | | | | | | |
|---|---|---|---|---|---|---|---|---|---|---|
| | 1 | 2 | 3 | 4 | 5 | 6 | 7 | 8 | 9 | 10 |
| MMA | 81 | 75 | 70 | 75 | 76 | 92 | 87 | 85 | 83 | 80 |
| Methyacrylic acid (MAA) | 14 | 15 | 15 | 15 | 20 | — | — | 10 | 6 | 10 |
| Anhydrous orthophosphoric acid | 5 | 5 | | | 4 | 8 | 6 | 5 | 5 | |
| Anhydrous Acids 104 | | | | 5 | | | | | | |
| Anhydrous ethyl hydrogen phosphate (50/50 mono- + diester) | | | 15 | | | | | | | 10 |
| Tris(chloroethyl) phosphate | | 5 | | 5 | | | 7 | | 6 | |
| % weight MAA/% compound P | 2.8 | 1.5 | 1 | 1.5 | 5.00 | 0 | 0 | 2 | 0.55 | 1 |
| FRC | 1.000 | 1.195 | 1.305 | 1.201 | 1.02 | 1.040 | 1.018 | 0.900 | 1.004 | 0.870 |
| Properties: | | | | | | | | | | |
| UL 94 vertical classification | VO | VO | VO | VO | VO | VO | VO | negative | VO | negative |
| Haze (%) after 170 h (40° C.) RH = 57.5% | 0.6 | 0.8 | 0.5 | 0.8 | 0.6 | 1.3 | 0.7 | 1.1 | 0.7 | 0.8 |
| Haze (%) after 2100 h (21° C.) RH = 55% | 1.2 | 0.8 | 0.6 | 0.8 | 0.9 | 17 | 5.1 | 2.7 | 10.6 | 0.8 |

What is claimed is:

1. A composition comprising:
   (a) at least one (meth)acrylic ester monomer and, optionally, an ethylenically unsaturated monomer copolymerizable with the (meth)acrylic acid ester monomer,
   (b) (meth)acrylic acid; and
   (c) at least one anhydrous phosphorus compound selected from the group consisting of phosphoric acids, phosphoric acid esters and mixtures thereof, optionally in combination with at least one optionally halogenated neutral phosphoric ester, and wherein:
   i) said composition comprises, based on the total weight of components (a), (b) and (c), 65 to 85% by weight of compound (a);
   ii) the proportions of compounds (b) and (c) are such that their weight ratio (b)/(c) is greater than 0.9; and
   iii) the flame-retardancy coefficient (FRC) is greater than 0.95, as determined by the following formula:

$$0.025 \times \% \text{ (meth)acrylic acid} + 0.13 \times \% \text{ phosphoric acid} + 0.14 \times \% \text{ OH-ester} + 0.20 \times \% \text{ P-ester} + 1.17 \times$$

$$\% \text{ halogenated P-ester} \times \frac{\text{Halogen atom no.}}{M \text{ (halogenated P-ester)}} = FRC.$$

2. A composition in accordance with claim 1, wherein the phosphorus compound (c) is selected from the group of phosphoric acids and phosphates consisting of orthophosphoric, pyrophosphoric, metaphosphoric, polyphosphoric acids, and alkyl hydrogen phosphates thereof; optionally in combination with phosphoric triesters, halogenated phosphoric triesters or both.

3. A composition according to claim 2, wherein the phosphorus compound (c) is a 50:50 by mole mixture of ethyl monoesters of phosphoric acid and ethyl diesters of phosphoric acid.

4. A composition according to claim 2, wherein the phosphorus compound (c) consists of an anhydrous mixture phosphate in which the halogen is chlorine or bromine and the alkyl group has from 1 to 4 carbon atoms.

6. A composition in accordance with claim 1, wherein (a) is methyl methacrylate.

7. A composition in accordance with claim 1, wherein (a) comprises 100 to 80% by weight of a (meth)acrylic monomer and from 0 to 20% of a monomer possessing ethylenic unsaturation.

8. A composition in accordance with claim 1, wherein (b) is methacrylic acid.

9. A composition in accordance with claim 1, wherein (b)/(c) is between 0.9 and 3.

10. A composition according to claim 1, which comprises 75% by weight methyl methacrylate, 15% by weight methacrylic acid, 5% by weight orthophosphoric acid and 5% by weight of tris(chloroethyl) phosphate.

11. A composition according to claim 1, which comprises 70% by weight of methyl methacrylate, 15% by weight methacrylic acid and 15% by weight of ethyl hydrogen phosphate in the form of a 50:50 by mole mixture of monoesters and diesters.

12. A composition according to claim 4, which comprises 75% by weight of methyl methacrylate, 15% by weight of methacrylic acid, 5% by weight of phosphoric acid mixture and 5% by weight of tris(chloroethyl) phosphate.

13. A composition according to claim 1, which further comprises up to 2% by weight, based on the total weight of the components (a) to (c), of at least one crosslinking agent.

14. A composition according to claim 1, which further comprises up to 1% by weight, based on the total weight of the components (a) to (c), of at least one ultraviolet-radiation absorbing agent.

15. A composition according to claim 1, which further comprises compounds up to 1% by weight, based on the total weight of the components (a) to (c), of at least one chain-limiting agent.

16. A composition in accordance with claim 1, which further comprises at least one radical polymerization initiator.

17. A process for the preparation of flame-retardant cast panels which comprises introducing a composition in accordance with claim 1 to be polymerized between two plates of a mold which is resistant to the maximum polymerization temperature of said composition, heating the composition to a temperature of between 30° C. and 100° C. for 2 to 20 hours and then between 90° C. and 140° C. for 1 to 4 hours in order to obtain bulk polymerization, cooling the polymerized composition and releasing the flame-retardant cast panel from the mold.

18. A flame-retardant cast panel formed from a composition in accordance with claim 1.

19. A composition formed from a combination comprising:
(a) at least one (meth)acrylic ester monomer and, optionally, an ethylenically unsaturated monomer copolymerizable with the (meth)acrylic acid ester monomer,
(b) (meth)acrylic acid; and
(c) at least one anhydrous phosphorus compound selected from the group consisting of phosphoric acids, phosphoric acid esters and mixtures thereof, optionally in combination with at least one optionally halogenated neutral phosphoric ester, and wherein:

i) said composition comprises, based on the total weight of components (a), (b) and (c), 65 to 85% by weight of compound (a);
ii) the proportions of compounds (b) and (c) are such that their weight ratio (b)/(c) is greater than 0.9; and
iii) the flame-retardancy coefficient FRC is greater than 0.95, as determined by the following formula:

$$0.025 \times \% \text{ (meth)acrylic acid} + 0.13 \times \% \text{ phosphoric acid} + 0.14 \times \% \text{ OH-ester} + 0.20 \times \% \text{ P-ester} + 1.17 \times$$

$$\% \text{ halogenated P-ester} \times \frac{\text{Halogen atom no.}}{M \text{ (halogenated P-ester)}} = FRC.$$

20. A composition as in claim 19 which has a viscosity between 30–1000 mPas without a radical polymerization initiator.

21. A composition according to claim 19, which further comprises at least one radical polymerization initiator.

22. A composition as in claim 21 which comprises polymers formed with said polymerization initiator.

23. A composition as in claim 22, which additionally comprises at least one post-polymerization initiator and modified polymers formed with said post-polymerization initiator.

\* \* \* \* \*